United States Patent [19]
Brooks et al.

[11] Patent Number: 6,033,531
[45] Date of Patent: Mar. 7, 2000

[54] SPECTRAL CATALYSTS

[75] Inventors: Juliana H. J. Brooks, Columbus, Ohio; Bentley J. Blum, New York, N.Y.

[73] Assignee: Berkshire Laboratories, Inc., Columbus, Ohio

[21] Appl. No.: 09/098,883

[22] Filed: Jun. 17, 1998

Related U.S. Application Data

[60] Provisional application No. 60/049,910, Jun. 18, 1997.

[51] Int. Cl.⁷ ..................................................... C07C 1/00
[52] U.S. Cl. ..................................................... 204/157.15
[58] Field of Search ......................................... 204/157.15

[56] References Cited

U.S. PATENT DOCUMENTS

| | | | |
|---|---|---|---|
| 2,161,292 | 6/1939 | Hahnemann | 250/11 |
| 4,012,301 | 3/1977 | Rich et al. | 204/157.1 |
| 4,115,280 | 9/1978 | Pratt | 250/527 |
| 4,481,091 | 11/1984 | Brus et al. | 204/157.1 R |
| 4,529,489 | 7/1985 | McDonald et al. | 204/158 |
| 4,755,269 | 7/1988 | Brumer et al. | 204/157.4 |
| 4,774,026 | 9/1988 | Kitamori et al. | 252/627 |
| 5,015,349 | 5/1991 | Suib et al. | 204/168 |
| 5,174,877 | 12/1992 | Cooper et al. | 204/193 |
| 5,395,490 | 3/1995 | Hoff et al. | 204/132 |

*Primary Examiner*—Edna Wong
*Attorney, Agent, or Firm*—Marianne Fuierer; Howard M. Ellis

[57] ABSTRACT

A wide variety of reactions can be advantageously affected and directed by a spectral catalyst which duplicates the electromagnetic energy spectral pattern of a physical catalyst and when applied to a reaction system transfers a quanta of energy in the form of electromagnetic energy to control and/or promote the reaction system. The spectral catalysts utilized in this invention can replace and/or augment the energy normally provided to the reaction system by a physical catalyst. A spectral catalyst may also act as both a positive catalyst to increase the rate of a reaction or as a negative catalyst to decrease the rate of reaction.

10 Claims, No Drawings

SPECTRAL CATALYSTS

CROSS REFERENCE TO RELATED APPLICATION

This application claims the benefit of U.S. Provisional Application Ser. No. 60/049,910 filed Jun. 18, 1997.

TECHNICAL FIELD

This invention relates to a novel method to control and/or direct a chemical reaction by exposing the reaction system to a frequency or frequencies of electromagnetic energy duplicating the spectral pattern of a physical catalyst.

BACKGROUND OF INVENTION

A chemical reaction can be activated or promoted either by the addition of energy to the reaction medium in the form of thermal and electromagnetic energy or by means of transferring energy through a physical catalyst. None of these methods are energy efficient and can produce either unwanted by-products, decomposition of the necessary transition state, or insufficient quantities of preferred products.

It is generally true that chemical reactions occur as a result of collisions between reacting molecules. In terms of the collision theory of chemical kinetics it is expected that the rate of a reaction is directly proportional to the number of the molecular collisions per second, or to the frequency of molecular collisions:

rate ∝ number of collision/sec

This simple relationship explains the dependence of reaction rates on concentration. Additionally, with few exceptions, reaction rates increase with increasing temperature because of increased collisions.

The dependence of the rate constant k of a reaction can be expressed by the following equation, known as the Arrhenius equation:

$$k = Ae^{-Ea/RT}$$

where Ea is the activation energy of the reaction which is the minimum amount of energy required to initiate a chemical reaction, R the gas constant, T the absolute temperature and e the base of the natural logarithm scale. The quantity A represents the collision frequency and shows that the rate constant is directly proportional to A and, therefore, to the collision frequency. Furthermore, because of the minus sign associated with the exponent $E_a/RT$, the rate constant decreases with increasing activation energy and increases with increasing temperature.

Normally, only a small fraction of the colliding molecules, the fastest-moving ones, have enough kinetic energy to exceed the activation energy, therefore, the increase in the rate constant k can now be explained with the temperature increase. Since more high-energy molecules are present at a higher temperature, the rate of product formation is also greater at the higher temperature. But, with increased temperatures there are a number of problems which are introduced into the reaction system. With thermal excitation other competing processes, such as bond rupture may occur before the desired energy state can be reached. Also, there are a number of decomposition products which often produce fragments that are extremely reactive, but they are so short lived because of their thermodynamic instability that a preferred reaction may be dampened.

Radiant or light energy is another form of energy that may be added to the reaction medium without the negative side effects of thermal energy. Addition of radiant energy to a system produces electronically excited molecules that are capable of undergoing chemical reactions.

A molecule in which all the electrons are in stable orbitals is said to be in the ground electronic state. These orbitals may be either bonding or nonbonding. If a photon of the proper energy collides with the molecule, i.e., the photon is absorbed and one of the electrons may be promoted to an unoccupied orbital of higher energy. Electronic excitation results in spatial redistribution of the valance electrons with concomitant changes in internuclear configurations. Since chemical reactions are controlled to a great extent by these factors, an electronically excited molecule undergoes a chemical reaction that may be distinctly different from those of its ground-state counterpart.

The energy of a photon is defined in terms of its frequency or wavelength, $$E = h\nu = hc/\lambda$$

where E is energy; h is Plank's constant, $6.6 \times 10^{-34}$ J.sec; $\nu$ is the frequency of the radiation, $\sec^{-1}$; c is the speed of light; and $\lambda$ is the wavelength of the radiation. When a photon is absorbed, all of its energy is imparted to the absorbing species. The primary act following absorption depends on the wavelength of the incident light. Photochemistry studies photons whose energies lie in the ultraviolet region (100–4000 Å) and in the visible region (4000–7000 Å) of the electromagnetic spectrum. Such photons are primarily a cause of electronically excited molecules.

Since the molecules are imbued with electronic energy upon absorption of light, reactions occur from entirely different potential-energy surfaces from those encountered in thermally excited systems. However, there are several drawbacks of using the known techniques of photochemistry, that being, utilizing a broad band of frequencies thereby causing unwanted side reactions, undue experimentation, and poor quantum yield.

A catalyst is a substance which alters the reaction rate of a chemical reaction without appearing in the end product. It is known that some reactions can be speeded up or controlled by the presence of substances which themselves remain unchanged after the reaction has ended. By increasing the velocity of a desired reaction relative to unwanted reactions, the formation of a desired product can be maximized compared with unwanted by-products. Often only a trace of catalyst is necessary to accelerate the reaction. Also, it has been observed that some substances, which if added in trace amounts, can slow down the rate of a reaction. This looks like the reverse of catalysis, and, in fact, substances which slow down a reaction rate have been called negative catalysts. Known catalysts go through a cycle in which they are used and regenerated so that they can be used again and again. A catalyst operates by providing another path for the reaction which can have a higher reaction rate or slower rate than available in the absence of the catalyst. At the end of the reaction, because the catalyst can be recovered, it appears the catalyst is not involved in the reaction. But, the catalyst must take part in the reaction, or else the rate of the reaction would not change. The catalytic act may be represented by five essential steps:

1. Diffusion to the catalytic site (reactant)
2. Bond formation at the catalytic site (reactant)
3. Reaction of the catalyst-reactant complex
4. Bond rupture at the catalytic site (product)
5. Diffusion away from the catalytic site (product).

The exact mechanisms of catalytic actions are unknown but they can speed up a reaction that otherwise would take place too slowly to be practical.

There are a number of problems involved with known industrial catalysts: firstly, catalysts can not only lose their efficiency but also their selectivity, which can occur due to overheating or contamination of the catalyst; secondly, many catalysts include costly metals such as platinum or silver and have only a limited life span, some are difficult to rejuvenate, and the precious metals not easily reclaimed.

Accordingly, what is needed is a method to catalyze a chemical reaction without the drawbacks of known physical catalysts and with greater specificity than thermal and known electromagnetic radiation methods.

SUMMARY OF THE INVENTION

TERMS

For purposes of this invention, the terms and expressions below, appearing in the specification and claims, are intended to have the following meanings:

"Spectral pattern" as used herein means a pattern formed by one or more electromagnetic frequencies emitted or absorbed after excitation of an atom or molecule.

"Catalytic spectral pattern" as used herein means a spectral pattern of a physical catalyst which when applied to a chemical reaction system in the form of a beam or field can catalyze a chemical reaction by the following:

a) completely replacing a physical chemical catalyst;
b) acting in unison with a physical chemical catalyst to increase the rate of reaction;
c) reducing the rate of reaction by acting as a negative catalyst; or
d) altering the path of a reaction for formation of a specific product.

Spectral catalyst" as used herein means electromagnetic energy which acts as a catalyst having a catalytic spectral pattern which affects, controls, or directs a chemical reaction.

"Frequency" as used herein includes the exact frequency or a substantially similar frequency.

The object of this invention is to control or direct a chemical reaction by applying electromagnetic energy in the form of a spectral catalyst having at least one electromagnetic energy frequency which may initiate, activate, or affect the reactants involved in the chemical reaction.

In this regards, it is a principal object of the present invention to provide an efficient, selective and economical process for replacing and/or augmenting a known physical catalyst in a chemical reaction comprising the steps of:

a) duplicating at least one frequency of a spectral pattern of a physical catalyst; and
b) exposing the reaction system to at least one frequency of the spectral pattern of the physical catalyst.

It is also an object of the present invention to provide a method to replace a physical catalyst in a chemical reaction system with a spectral catalyst comprising the steps of:

a) determining an electromagnetic spectral pattern of the physical catalyst; and
b) duplicating at least one frequency of the electromagnetic spectral pattern of the physical catalyst with at least one electromagnetic energy emitter source; and
c) exposing the chemical reaction system to the at least one frequency of the duplicated electromagnetic spectral pattern in a sufficient amount and duration to catalyze the chemical reaction.

A further object of this invention is to provide a method to affect and direct a chemical reaction system with a spectral catalyst by augmenting a physical catalyst comprising the steps of:

a) duplicating at least one frequency of a spectral pattern of the physical catalyst with at least one electromagnetic energy emitter source;
b) irradiating the chemical reaction system with the at least one frequency of the duplicated electromagnetic spectral pattern having a frequency range from about radio frequency to about ultraviolet frequency for a sufficient duration to catalyze the chemical reaction; and
c) introducing the physical catalyst into the reaction system.

The above method may be practiced by introducing the physical catalyst into the reaction system before, and/or during, and/or after the irradiation of the reaction system with the electromagnetic spectral pattern of the physical catalyst, the electromagnetic spectral pattern having electromagnetic energy wherein the specific frequency range is selected from a group consisting of about radio frequency to about x-ray frequency, about radio frequency to about ultraviolet, and from about infrared to about ultraviolet or the reaction system can be exposed to the physical and spectral catalysts simultaneously.

A still further object of this invention is to provide a method to affect and direct a reaction system with a spectral catalyst comprising the steps of:

a) determining an electromagnetic spectral pattern for starting reactant in said chemical reaction system;
b) determining an electromagnetic spectral pattern for end product in said chemical reaction system;
c) calculating an additive electromagnetic spectral pattern from said reactant and product spectral pattern to determine a catalytic spectral pattern;
d) generating at least one frequency of the catalytic spectral pattern; and
e) irradiating the reaction system with at least one frequency of the catalytic spectral pattern.

The specific physical catalysts that may be replaced or augmented in the present invention may include any solid, liquid or gas catalyst and having either homogeneous or heterogeneous catalytic activity. A homogeneous catalyst is defined as a catalyst whose molecules are dispersed in the same phase as the reacting chemicals. A heterogeneous catalyst is defined as one whose molecules are not in the same phase as the reacting chemicals. In addition, enzymes which are considered biological catalysts are to be included in the present invention. Some examples of catalysts that may be replaced or augmented comprise both elemental and molecular catalysts, including, but not limited to, metals, such as silver, platinum, nickel, palladium, rhodium, copper, ruthenium and iron; semiconducting metal oxides and sulfides, such as $NiO$, $ZnO$, $MgO$, $Bi_2O_3/MoO_3$, $TiO_2$, $SrTiO_3$, $CdS$, $CdSe$, $SiC$, $GaP$, $WO_2$, and; copper sulfate; platinum oxide insulating oxides, such as $Al_2O_3$, $SiO_2$, and $MgO$; and Ziegler-Natta catalysts, such as titanium tetrachloride, and trialkyaluminum.

While not wishing to be bound by any particular theory of operation, it is believed that a physical catalyst provides the necessary activation energy to the system which initiates and/or promotes the reaction to form the intermediates and/or final products. Accordingly, it has now been discovered that a physical catalyst can be replaced by duplicating its spectral pattern and by exposing the reaction system to electromagnetic energy in the form of electromagnetic radiation. The quanta of energy, having a specific frequency or frequencies can be determined by spectroscopic methods and delivered to the reaction system by means of irradiation from any means of generating electromagnetic energy.

DESCRIPTION OF THE PREFERRED EMBODIMENT

A wide variety of reactions can be advantageously affected and directed with the assistance of a spectral catalyst having a specific electromagnetic spectral pattern which transfers a predetermined quanta of energy to initiate, control and/or promote a reaction system. The spectral catalyst utilized in this invention can replace and provide the additional energy normally supplied by a physical catalyst. The spectral catalyst can act as both a positive catalyst to increase the rate of a reaction or as a negative catalyst to decrease the rate of reaction. Furthermore, the spectral catalyst can augment a physical chemical catalyst by utilizing both in a reaction system. The spectral catalyst can improve the activity of a chemical catalyst and may eliminate the high pressure and temperature requirements of many reactions. Also, the spectral catalyst can merely replace a specific quantity of the chemical catalyst, thereby reducing the high cost of physical catalysts in many industrial reactions.

In the present invention, the spectral catalyst provides electromagnetic radiation comprising a specific frequency or frequencies in a sufficient amount for a sufficient duration to initiate and/or promote a chemical reaction. With the absorption of electromagnetic energy from a spectral catalyst, a chemical reaction may proceed through one or several pathways including: energy transfer which can excite electrons to higher energy states for initiation of chemical reaction; ionize or dissociate reactants which may participate in a chemical reaction; stabilize end products; and energize or stabilize intermediates that participate in a chemical reaction.

If a chemical reaction provides for at least one reactant "A" to be converted to at least one product "B", a physical catalyst "C" may be utilized. In contrast, the spectral pattern of the catalyst "C" may be applied in the form of an electromagnetic beam or field to catalyze the reaction.

Substances A and B=unknown frequencies, and C=30 Hz; Therefore,

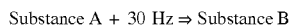

In the present invention the electromagnetic spectral pattern of the catalytic agent "C" can be determined by known methods of spectroscopy. Utilizing spectroscopic instrumentation, the electromagnetic spectral pattern of the physical catalyst agent is preferably determined under conditions approximating those occurring in the chemical reaction using the physical catalyst. Spectroscopy is a process in which the energy differences between allowed states of the system are measured by determining the frequencies of the corresponding electromagnetic energy which is either being absorbed or emitted. Spectroscopy in general deals with the interaction of electromagnetic radiation with matter. When photons interact with atoms or molecules, changes in the properties of atoms and molecules are observed.

Atoms and molecules are associated with several different types of motion. The entire molecule rotates, the bonds vibrate, and even the electrons move, albeit so rapidly that we generally deal only with electron density distributions. Each of these kinds of motion is quantified. That is, the atom or molecule can exist only in distinct states that correspond to discrete energy contents. The energy difference between the different quantum states depends on the type of motion involved. Thus the wavelength of energy required to bring about a transition is different for the different types of motion. That is, each type of motion corresponds to the absorption of energy in different regions of the electromagnetic spectrum and different spectroscopic instrumentation may be required for each spectral region. The total motion energy of an atom or molecule may be considered to be at least the sum of its electronic, rotational and vibrational energies.

In both emission and absorption spectra, the relation between the energy change in the atom or molecule and the frequency of the electromagnetic energy emitted or absorbed is given by the so-called Bohr frequency condition:

$$\Delta E = h\nu$$

where h is Planck's constant, v is the frequency and $\Delta E$, is the difference of energies in the final and initial states.

Electronic spectra are the result of electrons moving from one electronic energy level to another in an atom or molecule. A molecular physical catalyst's spectral pattern includes not only electronic energy transitions but also may involve transitions between rotational and vibrational energy levels. As a result, the spectra of molecules are much more complicated than those of atoms. The main changes observed in the atoms or molecules after interaction with photons include excitation, ionization and/or rupture of chemical bonds, all of which may be measured and quantified by spectroscopic methods including emission or absorption spectroscopy which give the same information about energy level separation.

In emission spectroscopy, when an atom or molecule is subjected to a flame or an electric discharge, they may absorb energy and become "excited." On their return to their "normal" state they may emit radiation. Such an emission is the result of a transition of the atom or molecule from a high energy or "excited" state to one of lower state. The energy lost in the transition is emitted in the form of electromagnetic energy. "Excited" atoms usually produce line spectra while "excited" molecules tend to produce band spectra.

In absorption spectroscopy the absorption of nearly monochromatic incident radiation is monitored as it is swept over a range of frequencies. During the absorption process the atoms or molecules pass from a state of low energy to one of high energy. Energy changes produced by electromagnetic energy absorption occur only in integral multiples of a unit amount of energy called a quantum, which is characteristic of each absorbing species. Absorption spectra may be classified into four types: rotational, rotation-vibration, vibrational and electronic.

The rotational spectrum of a molecule is associated with changes which occur in the rotational states of the molecule. The energies of the rotational states differ only by a relatively small amount, and hence, the frequency of light which is necessary to effect a change in the rotational levels is very small and the wavelength of electromagnetic energy is very large. The energy spacing of molecular rotational states depends on bond distances and angles. Pure rotational spectra are observed in the far infrared and microwave and radio regions (See Table 1).

Rotation-vibrational spectra are associated with transitions in which the vibrational states of the molecule are altered and may be accompanied by changes in rotational states. Absorption occurs at larger frequencies or shorter wavelength and usually occur in the middle of the infrared region (See Table 1).

Vibrational spectra from different vibrational energy levels occur because of bending and stretching of bonds. A stretching vibration involves a change in the interatomic distance along the axis of the bond between two atoms. Berding vibrations are characterized by a change in the angle between two bonds. The vibrational spectra of a molecule is in the near-infrared range.

Electronic spectra are from transitions between electronic states for atoms and molecules are accompanied by simultaneous changes in the rotational and vibrational states in molecules. Relatively large energy differences are involved, and hence absorption occurs at rather large frequencies or relatively short wavelengths. Different electronic states of atoms or molecules correspond to energies in the infrared, ultraviolet-visible or x-ray region of the electromagnetic spectrum (See Table 1).

TABLE 1

Approximate Boundaries

| Region Name | Energy, J | Wavelength | Frequency, Hz |
|---|---|---|---|
| X-ray | $2 \times 10^{-14} - 2 \times 10^{-17}$ | 10-2–10 nm | $3 \times 10^{19} - 3 \times 10^{16}$ |
| Vacuum ultraviolet | $2 \times 10^{-17} - 9.9 \times 10^{-19}$ | 10–200 nm | $3 \times 10^{16} - 1.5 \times 10^{15}$ |
| Near ultraviolet | $9.9 \times 10^{-19} - 5 \times 10^{-19}$ | 200–400 nm | $1.5 \times 10^{15} - 7.5 \times 10^{14}$ |
| Visible | $5 \times 10^{-19} - 2.5 \times 10^{-19}$ | 400–800 nm | $7.5 \times 10^{14} - 3.8 \times 10^{14}$ |
| Near Infrared | $2.5 \times 10^{-19} - 6.6 \times 10^{-20}$ | 0.8–2.5 $\mu$m | $3.8 \times 10^{14} - 1 \times 10^{14}$ |
| Fundamental infrared | $6.6 \times 10^{-20} - 4 \times 10^{-21}$ | 2.5–50 $\mu$m | $1. \times 10^{14} - 6 \times 10^{12}$ |
| Far infrared | $4 \times 10^{-21} - 6.6 \times 10^{-22}$ | 50–300 $\mu$m | $6 \times 10^{12} - 1 \times 10^{12}$ |
| Microwave | $6.6 \times 10^{-22} - 4 \times 10^{-25}$ | 0.3 mm–0.5 m | $1 \times 10^{12} - 6 \times 10^{8}$ |
| Radiowave | $4 \times 10^{-25} - 6.6 \times 10^{-34}$ | $0.5-300 \times 10^{6}$ m | $6 \times 10^{8} - 1$ |

Electromagnetic radiation as a form of energy can be absorbed or emitted, and therefore many different types of spectroscopy may be used in the present invention to determine the spectral pattern of the physical catalyst including, but not limited to, x-ray, ultraviolet, infrared, microwave, atomic absorption, flame emissions, atomic emissions, inductively coupled plasma, DC argon plasma, arc-source emission, spark-source emission, high-resolution laser, radio, Raman and the like.

In order to study the electronic transitions the material to be studied may need to be heated to a high temperature, such as in a flame, where the molecules are atomized and excited. Another, very effective way of atomizing gases is the use of gaseous discharges. When a gas is placed between charged electrodes, causing an electrical field, electrons are liberated from the electrodes and from the gas atoms themselves. These electrons will collide with the gas atoms which will be atomized, excited or ionized. By using high frequency fields it is possible to induce gaseous discharges without using electrodes. By varying the field strength, the excitation energy can be varied. In the case of a solid material, excitation by electrical spark or arc can be used. In the spark or arc, the material to be analyzed is evaporated and the atoms are excited.

The basic scheme of an emission spectrophotometer includes a purified silica cell containing the sample which is to be excited. The radiation of the sample passes through a slit and is separated into a spectrum by means of a dispersion element. The spectral pattern can be detected on a screen, photographic film, or by a detector.

An atom will most strongly absorb electromagnetic energy at the same frequencies it emits. Measurements of absorption are often made so that electromagnetic radiation that is emitted from a source passes through a wavelength-limiting device, and impinges upon the physical catalyst sample that is held in a cell. When a beam of white light passes through a material, selected frequencies from the beam are absorbed. The electromagnetic radiation that is not absorbed by the physical catalyst passes through the cell and strikes a detector. When the remaining beam is spread out in a spectrum, the frequencies that were absorbed show up as dark lines in the otherwise continuous spectrum. The position of these dark lines correspond exactly to the positions of lines in an emission spectrum of the same molecule or atom. Both emission and absorption spectrophotometers are available through regular commercial channels.

After determining the electromagnetic spectral pattern of the physical catalyst agent, the spectral pattern may be duplicated and applied to the chemical reaction system. Any generator of one or more frequencies within an acceptable approximate range of frequencies of electromagnetic radiation may be used in the present invention. When duplicating one or more frequencies in a catalyst spectrum, it is not necessary to duplicate the frequency exactly. For instance, the effect achieved by a frequency of 1,000 Thz, can also be achieved by a frequency very close to it, such as 1,001 or 999 Thz. Thus there will be a range above and below each exact frequency which will also catalyze a reaction. In addition, harmonics of spectral catalyst frequencies, both above and below the exact frequency, will cause sympathetic resonance with the exact frequency and will catalyze the reaction. Finally, it is possible to catalyze reactions by duplicating one or more of the mechanisms of action of the exact frequency, rather than using the exact frequency itself. For example, platinum catalyzes the formation of water from hydrogen and oxygen, in part, by energizing the hydroxyl radical at its frequency of roughly 1,060 Thz. The reaction can also be catalyzed by energizing the hydroxy radial with its microwave frequency, thereby duplicating platinum's mechanism of action.

An electromagnetic radiation emitting source should have the following characteristics: high intensity of the desired wavelengths, long life, stability and the ability to emit the electromagnetic energy in a pulsed and/or continuous mode.

Irradiating sources can include, but are not limited to, arc lamps, such as xenon-arc, hydrogen and deuterium, krypton-arc, high-pressure mercury, platinum, silver; plasma arcs, discharge lamps, such as As, Bi, Cd, Cs, Ge, Hg, K, P, Pb, Rb, Sb, Se, Sn, Ti, Tl and Zn; hollow-cathode lamps, either single or multiple elements such as Cu, Pt, and Ag; sunlight and coherent electromagnetic energy emissions, such as masers and lasers.

Masers are devices which amplify or generate electromagnetic energy waves with great stability and accuracy. Masers operate on the same principal as lasers, but produce electromagnetic energy in the radio and microwave, rather than visible range of the spectrum. In masers the electromagnetic energy is produced by the transition of molecules between rotational energy levels.

Lasers are powerful coherent photon sources that produce a beam of photons having the same frequency, phase and direction, that is, a beam of photons that travel exactly alike. The predetermined spectral pattern of the physical catalyst can be generated by a series or grouping of lasers producing the required frequencies. Any laser capable of emitting the necessary electromagnetic radiation with a frequency or frequencies of the spectral catalyst may be used in the present invention. Lasers are available for usia throughout much of the spectral range. They can be operated in either continuous or pulsed mode. Lasers that emit lines and lasers that emit a continuum may be used in these present invention. Line sources may include argon ion laser, ruby laser, the nitrogen laser, the Nd:YAG laser, the carbon dioxide laser, the carbon monoxide laser, and the nitrous oxide-carbon dioxide laser. In addition to the spectral lines that are emitted by lasers, several other lines are available by addition or subtraction in a crystal of the frequency emitted by one laser to or from that emitted by another laser. Devices that combine frequencies and may be used in the present invention include difference frequency generators and sum frequency mixers. Other lasers that may be used in this invention include, but is not limited to crystal, such as $Al_2O_3$ doped with $Cr^{3+}$, $Y_3Al_5O_{12}$ doped with $Nd^{3+}$; gas, such as He-Ne, Kr-ion; glass, chemical, such as vibrationally excited HCL and HF; dye, such as RHODAMINE 6G in methanol; and semiconductor lasers, such as $Ga_{1-x}Al_xAs$. Many models can be tuned to various frequency ranges, thereby providing several different frequencies from one instrument and applying to the reaction system (See Table 2).

TABLE 2

SEVERAL POPULAR LASERS

| Medium | Type | Emitted wavelength, nm |
|---|---|---|
| Ar | Gas | 334, 351.1, 363.8, 454.5, 457.9, 465.8, 472.7, 476.5, 488.0, 496.5, 501.7, 514.5, 528.7 |
| Kr | Gas | 350.7, 356.4, 406.7, 413.1, 415.4, 468.0, 476.2, 482.5, 520.8, 530.9, 568.2, 647.1, 676.4, 752.5, 799.3 |
| He—Ne | Gas | 632.8 |
| He—Cd | Gas | 325.0, 441.6 |
| $N_2$ | Gas | 337.1 |
| XeF | Gas | 351 |
| KrF | Gas | 248 |
| ArF | Gas | 193 |
| Ruby | Solid | 693.4 |
| Nd:YAG | Solid | 266, 355, 532 |
| $Pb_{1-x}Cd_xS$ | Solid | $2.9 \times 10^3 - 2.6 \times 10^4$ |
| $Pb_{1-x}Se_x$ | Solid | $2.9 \times 10^3 - 2.6 \times 10^4$ |
| $Pb_{1-x}Sn_xSe$ | Solid | $2.9 \times 10^3 - 2.6 \times 10^4$ |
| $Pb_{1-x}Sn_xTe$ | Solid | $2.9 \times 10^3 - 2.6 \times 10^4$ |
| Dyes | Liquid | 217–1000 |

The coherent light from a single laser or a series of lasers is simply brought to focus in the region where the reaction is to take place. The light source must be close enough to avoid a "dead space" in which the light does not reach the reactant, but far enough apart to assure complete incident-light absorption. Since ultraviolet sources generate heat, they may need to be cooled to maintain efficient operation. Irradiation time, causing excitation of the reactants, will be individually tailored for each reaction: some short-term for a continuous reaction with large surface exposure to the light source or long light-contact time for other systems.

A further object of this invention is to provide electromagnetic energy to the reaction system by applying a spectral pattern determined and calculated by waveform analysis of the spectral patterns of the reactants and the products. This catalytic spectral pattern will act as a spectral catalyst to generate a preferred chemical reaction. In basic terms, spectroscopic data for identified substances can be used to perform a simple waveform calculation to arrive at the correct electromagnetic energy frequency needed to catalyze a reaction.

$$A \overset{c}{\Rightarrow} B$$

Substance A=50 Hz, and Substance B=80 Hz
80 Hz–50 Hz=30 Hz:
Therefore,

Substance A + 30 Hz ⇒ Substance B.

The spectral patterns of both the reactant and product can be determined. This can be accomplished by the spectroscopic means mentioned earlier. Once the spectral patterns are determined with the specific frequency or frequencies of the interaction of the substance with electromagnetic radiation, the spectral patterns of the spectral catalyst can be determined. Using the spectral patterns of the reactants and products, a waveform analysis calculation can determine the energy difference between the reactants and products and the calculated spectral pattern is applied to the system to catalyze the reaction. The specific frequency or frequencies of the spectral pattern will provide the necessary energy input into the system to affect and initiate a chemical reaction.

Performing the waveform analysis calculation to arrive at the correct electromagnetic energy frequency or frequencies can be accomplished by using complex algebra, Fourier transformation, or Wavelet Transforms which is available through commercial channels under the trademark Mathematica® and supplied by Wolfram, Co.

The spectral pattern of the physical catalyst may be generated and applied to the reaction system by the electromagnetic radiation emitting sources defined and explained earlier.

The use of a spectral catalyst may be applicable in many different areas of technology ranging from biochemical processes to industrial reactions.

The most amazing catalysts are enzymes which catalyze the multitudinous reactions in living organisms. Of all the intricate processes that have evolved in living systems, none are more striking or more essential than enzyme catalysis. The amazing fact about enzymes is that not only can they increase the rate of biochemical reactions by reactors ranging from $10^6$ to $10^{12}$, but they are also highly specific. An enzyme acts only on certain molecules while leaving the rest of the system unaffected. Some have been found to have a high degree of specificity while others can catalyze a number of reactions. If a biological reaction can be catalyzed by only one enzyme then the loss of activity or reduced activity of that enzyme could greatly inhibit the specific reaction and could be detrimental to a living organism. If this situation occurs, the spectral pattern could be determined for the exact enzyme or mechanism, then genetic deficiencies could be augmented by providing the catalytic spectral pattern to replace the enzyme. One of the objects of this invention is to provide the same frequency or frequencies of energy in the form of a spectral catalyst that is transferred by an enzyme.

The invention will be more clearly perceived and better understood from the following specific examples.

EXAMPLE 1

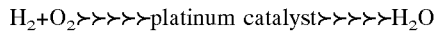
$H_2 + O_2 \text{≻≻≻≻platinum catalyst≻≻≻≻} H_2O$

Water can be produced by the method of contacting $H_2$ and $O_2$ on a physical platinum catalyst but there is always the possibility of producing a potentially dangerous explosive risk. This experiment replaced the physical platinum catalyst with a spectral catalyst comprising the spectral pattern of the physical platinum catalyst.

To demonstrate that oxygen and hydrogen can combine to form water utilizing a spectral catalyst, electrolysis of water was performed to provide the necessary oxygen and hydrogen starting gases. A triple neck flask was fitted with two (2) rubber stoppers on the outside necks, each fitted with glass encased platinum electrodes. The flask was filled with distilled water and a pinch of salt. The central neck was connected via a rubber stopper to vacuum tubing, which led to a Drierite column to remove any water from the produced gases. After vacuum removal of all gases in the system, electrolysis was conducted using a 12 V power source attached to the two electrodes. Electrolysis was commenced with the subsequent production of hydrogen and oxygen gases. The gases passed through the Drierite column, through vacuum tubing connected to positive and negative pressure gauges and into a sealed round quartz flask. A piece of paper which contained dried cobalt was placed in the bottom of the sealed flask. Cobalt paper was used because it turns pink in the presence of water, and blue when there is no water present. Initially the cobalt paper was blue.

The traditional physical platinum catalyst was replaced by spectral catalyst platinum emissions from a Fisher Scientific Hollow Cathode Platinum Lamp which was positioned approximately 2 cm from the flask. This allowed the oxygen and hydrogen gases in the round quartz flask to be irradiated with emissions from the spectral catalyst. A Cathodeon Hollow Cathode Lamp Supply C610 was used to power the Pt lamp at 80% maximum current (12 mAmps). The reaction flask was cooled using dry ice in a Styrofoam container positioned directly beneath the round quartz flask, thus preventing any possible catalysis from heat. The Pt lamp was turned on and within 2 to 3 days of irradiation a noticeable pink color was evident on the cobalt paper strip, indicating the presence of water in the round quartz flask. A similar cobalt test strip exposed to the ambient air in the lab remained blue. Over the next 4–5 days, with continued spectral catalyst application, the pink colored area on the cobalt strip became brighter and larger. At the end of the experiment the lamp was turned off but the system remained connected. Over the next 4 to 5 days the pink colored area slowly dissipated, indicating that any water produced in the flask slowly escaped and that the water produced was due to the chemical reaction catalyzed by the platinum lamp and not ambient moisture in the flask.

Upon discontinuation of the Pt emission, $H_2O$ diffused out of the cobalt strip to be taken up in the Drierite column and the pink coloration of the cobalt strip faded.

EXAMPLE 2

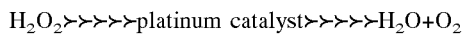
$H_2O_2 \text{≻≻≻≻platinum catalyst≻≻≻≻} H_2O + O_2$

The decomposition of hydrogen peroxide is an extremely slow reaction in the absence of catalysts. Accordingly, an experiment was performed to show that the physical catalyst, finely divided platinum, could be replaced with the spectral catalyst having the spectral pattern of platinum. Hydrogen peroxide was placed in 2 nippled quartz tubes. Both quartz tubes were inverted in beaker reservoirs filled with hydrogen peroxide and were shielded with card board wrapped in aluminum foil to block incident light. One of the wrapped tubes was used as a control. The other quartz tube set-up was exposed to a Fisher Scientific Hollow Cathode Lamp for platinum (Pt) using a Cathodeon Hollow Cathode Lamp Supply C610, at 80% maximum current (12 mAmps) for 24–96 hours. This tube set-up was monitored for increases in temperature to assure that any reaction was not due to thermal effects. A large bubble of $O_2$ formed in the nipple of the tube exposed to the spectral pattern of Pt, but not in the control tube.

As a negative control to confirm that any lamp would not cause the same result, the experiment was repeated with a Na lamp. (Na in a traditional reaction would be a reactant with water releasing hydrogen gas, not a catalyst of hydrogen peroxide breakdown.) The results showed no large bubble formation as with the spectral pattern of Pt emission. This indicated that while spectral emissions can substitute for catalysts, they cannot yet substitute for reactants. Also it indicated that the simple effect of using a hollow cathode tube emitting heat and energy into the hydrogen peroxide was not the cause of the gas bubble formation but instead the spectral pattern of Pt replacing the physical catalyst caused the reaction.

EXAMPLE 3

It is well known that certain susceptible organisms have a toxic reaction to silver (such as *E.coli, Strep pneumoniae,* or *Staph. aureus*). In this regard, an experiment was conducted to show that the spectral catalyst emitting the spectrum of silver demonstrated a similar effect on these organisms. Wild *E.coli,* wild *Strep pneumoniae,* wild *Staph. aureus* and wild *Salmonella typhi* bacteria were plated onto standard growth medium in separate petri dishes. Each dish was placed at the bottom of an exposure chamber. A foil covered cardboard sheet with a patterned slit was placed over each culture plate. A Fisher Scientific Hollow Cathode Lamp for Silver (Ag) was inserted through the lid of the exposure chamber so that the spectral emission pattern of silver was irradiating the bacteria on the culture plate. A Cathodeon Hollow Cathode Lamp Supply C610 was used to power the Ag lamp at 80% maximum current (3.6 mAmps.) The culture plate was exposed to the Ag emission for 12–24 hours, and then the plates were incubated using standard techniques. There was no growth of bacteria in the patterned slit section exposed to the silver emission for wild *E.coli,* wild *Strep, Pneumoniae,* wild *Staph. Aureus*. The wild Salmonella showed growth inhibition.

EXAMPLE 4

To further demonstrate that certain susceptible organisms which have a toxic reaction to silver would have a similar reaction to the spectral catalyst emitting the spectrum of silver. Cultures were obtained from the American Type Culture Collection (ATCC) which included *Escherichia coli* #25922, *Klebsiella pneumonia,* subsp Pneumoniae, # 13883. The organisms were plated onto a standard growth medium in a petri dish. The dish was placed in the bottom of an exposure chamber such as the bottom of a coffee can. A Fisher Scientific Hollow Cathode Lamp for Silver (Ag) was inserted through the lid (aluminum foil covered coffee lid) of the exposure chamber so that the spectral emission pattern of silver was shining on the culture plate. A Cathodeon Hollow Cathode Lamp Supply C610 was used to power the Ag lamp at 80% maximum current (3.6 Atps.) The culture plate was exposed to the Ag emission for 12–24 hours, and then incubated using standard techniques. Plates were examined using binocular microscope. The *E. coli* exhibited moderate resistance to the bactericidal effects of the spectral silver emission, while the Klebsiella exhibited moderate sensitivity.

To demonstrate a similar result using the physical silver catalyst, a colloidal silver solution was prepared at 80 ppm, using 5 cc of 0.9% sterile saline and distilled water. Sterile test discs for antibiotic tests were soaked in the colloidal silver solution. The same organisms were again plated from stock cultures onto standard growth medium in a petri dish. Colloidal silver test discs were placed on each plate and the plates were incubated using standard techniques. The *E. coli* again exhibited moderate resistance built this time to the bactericidal effects of the physical colloidal silver, while the Klebsiella again exhibited moderate sensitivity.

EXAMPLE 5

To demonstrate that oxygen and hydrogen can combine to form water utilizing a spectral catalyst to augment a physical catalyst, electrolysis of water was performed to provide the necessary oxygen and hydrogen starting gases, as in Example 1.

Two quartz flasks (A and B) were connected to the electrolysis system, each with it own set of vacuum and pressure gauges. Platinum powder (31 mg) was placed in each flask. The flasks were filled with $H_2$ and $O_2$ to 120 mm Hg, and the pressure in each flask was recorded as the reaction proceeded. Additionally, the test was repeated filling each flask with $H_2$ and $O_2$ to 220 mm Hg. Catalysis of the reaction by the physical catalyst only yielded baseline reaction curves.

The traditional physical platinum catalyst was augmented with spectral catalyst platinum emissions from two (2) parallel Fisher Scientific Hollow Cathode Platinum Lamps, as in Example 1., which were positioned 2 cm from flask A. This allowed the oxygen and hydrogen gases, as well as the physical platinum catalyst, to be irradiated with emissions from the spectral catalyst. Rate of reaction, as measured by decrease in pressure, and after controlling for temperature, increased up to 70% above the baseline rate, with a mean increase in reaction rate of approximately 60%.

I claim:

1. A method to replace a physical catalyst in a chemical reaction system with a spectral catalyst comprising the steps of:
   a) determining an electromagnetic spectral pattern of said physical catalyst;
   b) duplicating at least one frequency of said electromagnetic spectral pattern of said physical catalyst with at least one electromagnetic energy emitter source; and
   c) irradiating said chemical reaction system with said at least one frequency of said duplicated electromagnetic spectral pattern in a sufficient amount to catalyze said chemical reaction.

2. The method according to claim 1 wherein said physical catalyst is a member selected from the group consisting of metal, metal oxides, and metal sulfides.

3. The method according to claim 1 wherein said electromagnetic energy has a frequency range from about radio frequency to about ultraviolet frequency.

4. The method according to claim 1 wherein said physical catalyst is a member selected from the group consisting of silver, platinum, platinum oxide, nickel, palladium, rhodium, copper, ruthenium and iron.

5. The method according to claim 1 wherein said physical catalyst is Ag.

6. The method according to claim 5 wherein said electromagnetic energy has a frequency in the range from about infrared to about ultraviolet.

7. The method according to claim 6 wherein said electromagnetic energy emitter source is selected from the group consisting of a Ag hollow cathode tube and at least one laser.

8. The method according to claim 1 wherein said physical catalyst is an enzyme.

9. The method according to claim 1 wherein said electromagnetic spectral pattern is determined by spectroscopy methods.

10. A method for replacing a physical catalyst in a chemical reaction comprising the following steps of:
   a) duplicating at least one frequency of an electromagnetic spectral pattern of said physical catalyst; and
   b) exposing said chemical reaction to said at least one frequency of said duplicated electromagnetic spectral pattern in a sufficient amount to catalyze said chemical reaction.

* * * * *